United States Patent [19]
Anderson

[11] 4,082,344
[45] Apr. 4, 1978

[54] MOTOR VEHICLES

[75] Inventor: James Anderson, Preston, England

[73] Assignee: British Leyland UK Limited, London, England

[21] Appl. No.: 703,932

[22] Filed: Jul. 9, 1976

[30] Foreign Application Priority Data

Jul. 18, 1975    United Kingdom ............... 30158/75

[51] Int. Cl.² ........................................... B62D 33/06
[52] U.S. Cl. ................................. 296/28 C; 55/385 B; 180/89.14
[58] Field of Search ............... 180/89.14, 89.16, 89.18, 180/89.19; 296/28 C; 55/319

[56] References Cited

U.S. PATENT DOCUMENTS

| 2,781,102 | 2/1957 | Prichard | 180/89.14 |
| 3,390,914 | 7/1968 | Sewelin | 180/89.14 |
| 3,641,744 | 2/1972 | Culbert | 180/89.14 |

*Primary Examiner*—Philip Goodman
*Attorney, Agent, or Firm*—Brisebois & Kruger

[57] ABSTRACT

A truck having a cab of the tilting variety includes an enclosure for the engine which enclosure is in two parts, the first part carried by the chassis and the second part carried by the cab so that when the cab is tilted the enclosure is opened for access to the engine.

10 Claims, 3 Drawing Figures

MOTOR VEHICLES

The present invention relates to motor vehicles, particularly motor road vehicles such as trucks, and is concerned with reducing the noise level of such vehicles when in operation.

There have been proposals in the past to enclose a vehicle engine in order to reduce the external noise level of the vehicle due to the engine itself. Many of these pose problems of high ambient temperatures and restricted access to the major engine components and/or its auxiliaries such as a fuel pump or alternator. The present invention is concerned with providing an effective and convenient form of engine enclosure for the purpose of reducing the overall vehicle noise level.

1. According to the present invention a truck has the following features:
   a. a chassis on which an engine is mounted;
   b. a cab tiltably mounted on the chassis and in its operative position overlying the engine at least in part;
   c. an enclosure surrounding the engine when the cab is in its operative position, the enclosure comprising substantially two parts, a first part carried by the chassis and a second part carried by the cab so that when the cab is tilted the second part separates from the first part to expose the engine or at least part of it.
2. A motor road vehicle as in (1) in which seals are fitted on the joint edges of the second part of the engine enclosure, but not at the joint edges of the first part so that when the truck cab is tilted the seals between the first and second parts of the engine enclosure will be moved clear and be less likely to be damaged during maintenance of the engine.
3. A motor road vehicle as in (1) in which the engine enclosure has an undertray which is detachably secured to the underside of the front part of the enclosure.
4. A motor road vehicle as in any paragraph (1) – (3) in which a centrifugal or mixed flow fan is positioned in front of the enclosure and its outlet connected to the interior of the enclosure, through the fixed front part of the enclosure, by a duct or ducts so that cooling air can be fed into the enclosure.
5. A motor road vehicle as in (4) in which the centrifugal or mixed flow fan arrangement is as specified in any of numbered paragraphs (4) – (9) of our co-pending patent application No. 30156/75 (Our Reference P.1112).
6. A motor road vehicle as in any previously numbered paragraph in which the engine enclosure has air inlets in its leading end which are positioned in the front of the fixed part of the enclosure and therefore relatively low down and air outlets located at the rear end of the enclosure in the second movable part of the enclosure and therefore relatively high up so as to promote convection currents within the enclosure for cooling the engine after it has been stopped and the fan is no longer rotating.
7. A motor road vehicle as in (6) in which each of the said outlets is fitted with a flap or other valve which is adapted to automatically close in the event of a fire within the enclosure.
8. A motor road vehicle as in any previously numbered paragraph in which the top of the enclosure carries a sound deadening/absorbing material.

How the invention may be carried out will now be described by way of example only and with reference to the accompanying drawings in which.

Figure 1:
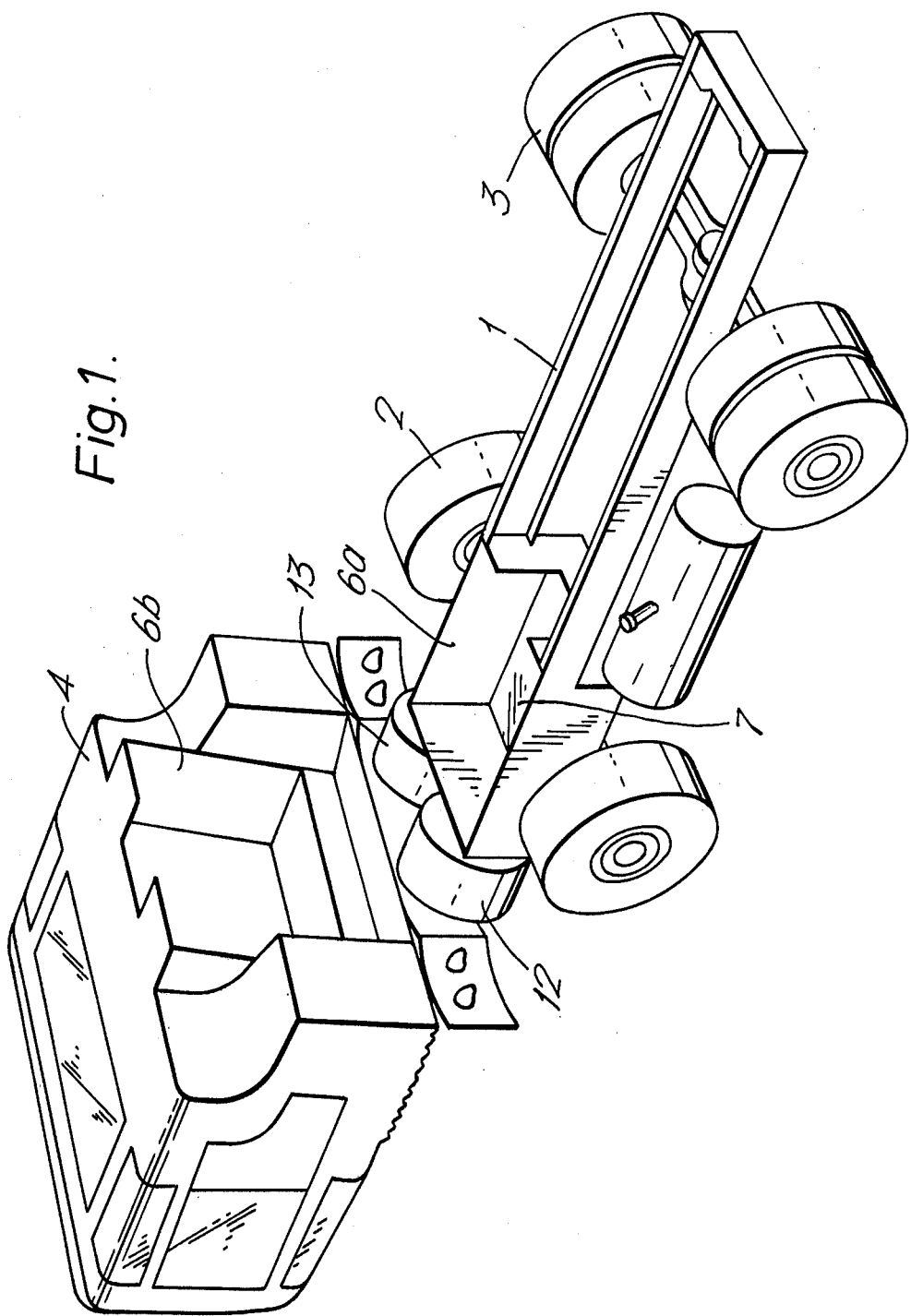
FIG. 1 is a perspective diagrammatic view of a truck incorporating the present invention.

A tractor of a tractor semi-trailer truck has a chassis generally indicated by the reference numeral 1, front steerable wheels 2 mounted on a rigid transverse axle and rear driving wheels 3. A cab 4 is tiltably mounted at the front end of the chassis 1 and an engine 5 (FIG. 3) is mounted between the longitudinal chassis members at their front ends substantially beneath the cab 4 when the latter is in its operative position, ie. not tilted. The chassis may be constructed according to our co-pending patent application Ser. No. 17418/75.

When the cab 4 is in its operative position the engine 5 is substantially totally enclosed by an enclosure which comprises essentially a first part (6a) which is carried by the chassis 1 and a second part (6b) which is carried by the tilt cab 4 so that when the cab 4 is tilted the upper second part (6b) of the enclosure is hinged away from the lower fixed part (6a) in order to expose the engine 5 for maintenance.

The purpose of the enclosure 6 is to attenuate the sound generated by the engine when in operation. Seals are provided between the joint edges of the two parts of the enclosure (6a) and (6b), ie. along the joint line, and the seals are carried only by the upper movable second part (6b) of the enclosure. The reason for this is that when the cab is tilted the seals will be moved clear of the engine and will therefore be less likely to be damaged by the mechanic when he is servicing the engine. It is important that the seals should not be damaged or disturbed since even a relatively small gap between the two parts of the enclosure (6a) and (6b) could result in a significant increase in the "pass-by" noise level of the truck.

Figure 2:
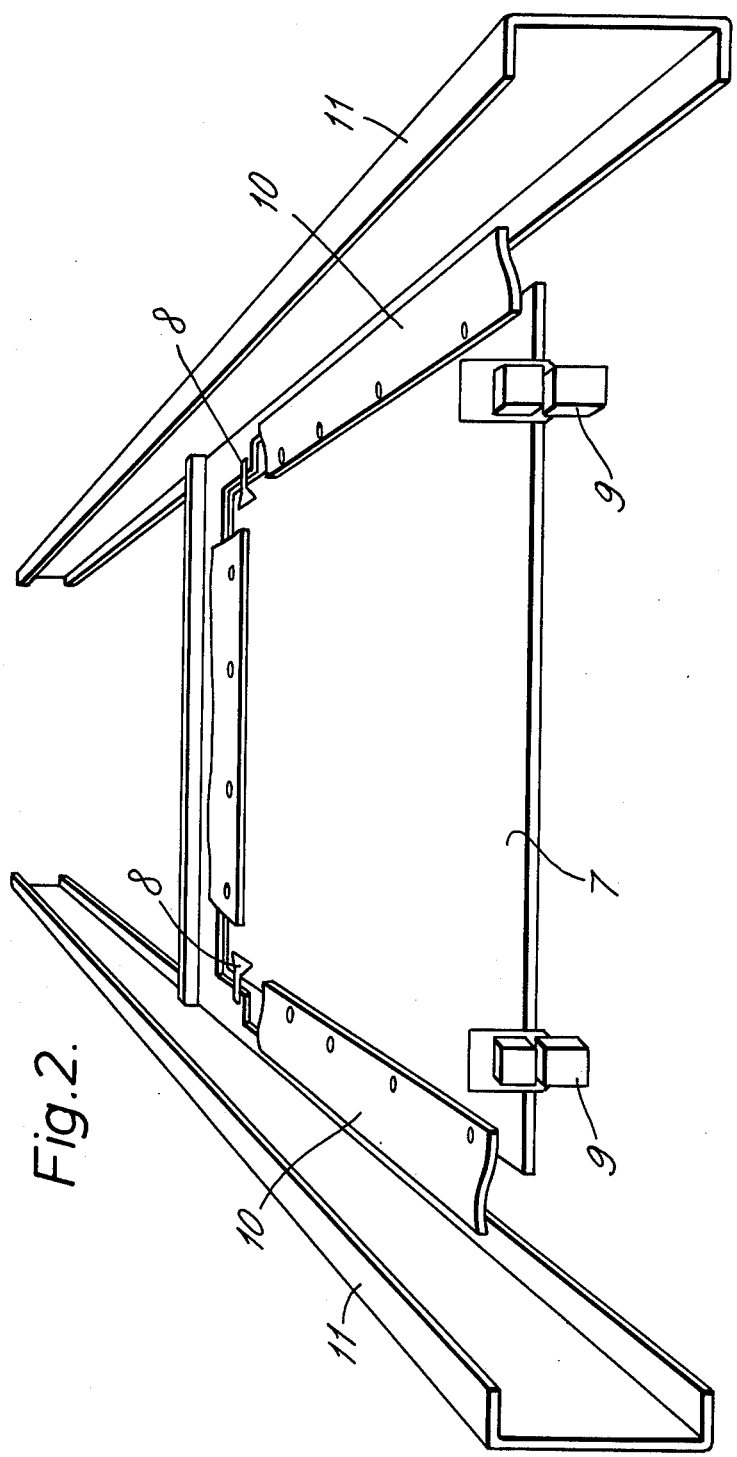
FIG. 2 is a perspective end view of part of the chassis of the truck shown in FIG. 1.

The underside of the enclosure, ie. the underside of the lower fixed part (6a) comprises a detachable undertray 7 (FIG. 2). The undertray 7 is located in position by dowels 8 at its trailing end and by overcentre catchs 9 at its leading end. Flexible seals 10 are carried by its side edges and are adapted to abut against the longitudinal frame side members 11 of the chassis 1 in order to prevent or minimise the escape of sound from the enclosure.

One or two centrifugal or mixed flow cooling fans may be located in front of the enclosure 6. In the embodiment shown in FIG. 1 two centrifugal or mixed flow fans 12 and 13 are employed. A radiator (not shown) is positioned in front of the centrifugal or mixed flow fans 12 and 13 in the manner described in our co-pending application Ser. No. 30156/75 (Our Reference P.1112). Cooling air is fed from the centrifugal or mixed flow fans 12 and 13 into the enclosure 6 through ducts which are not illustrated but which are again described in our co-pending application Ser. No. 30156/75 (Our Reference P.1112).

Figure 3:
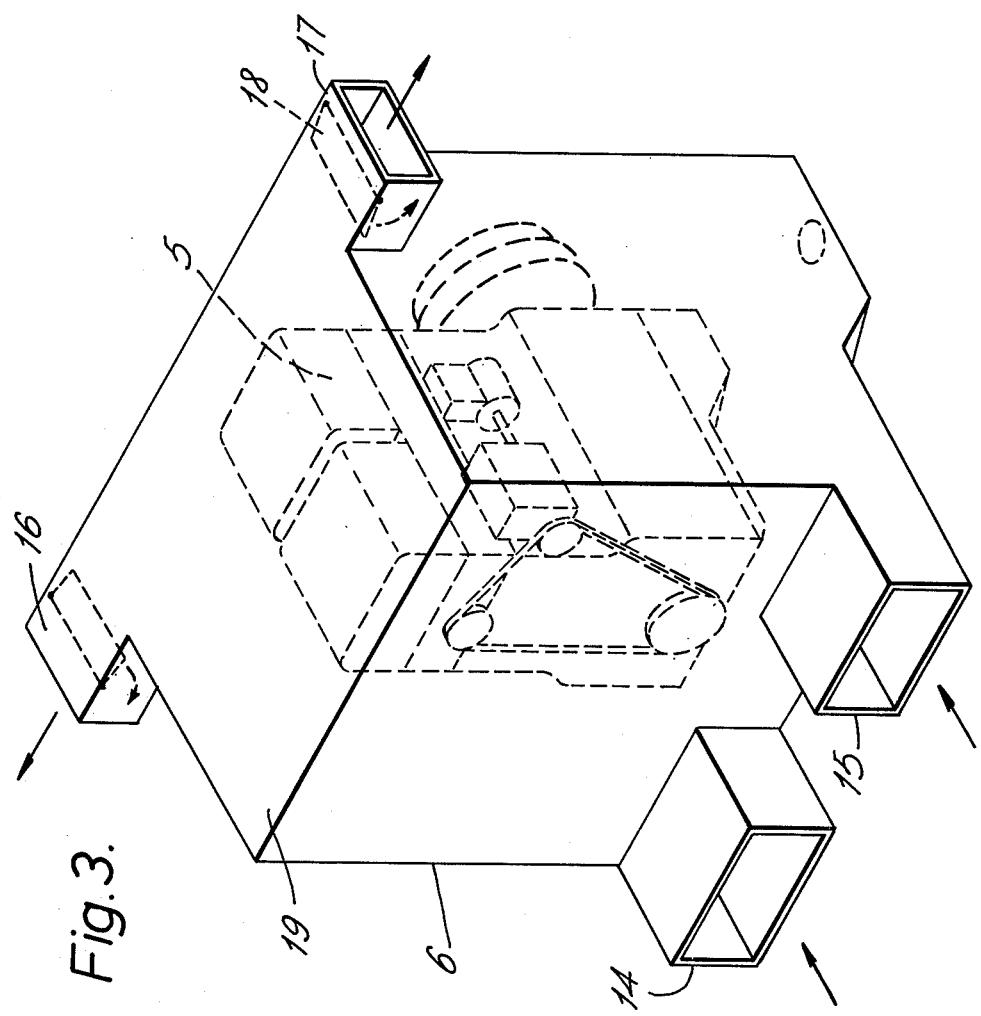
FIG. 3 is a perspective view showing the engine and its enclosure in more detail.

The construction of the enclosure 6 is shown in more detail in FIG. 3.

There are two low level air inlets 14 and 15 which are part of the lower fixed part (6a) of the enclosure and high level outlets 16 and 17 which are part of the upper movable part of the enclosure (6b). By having the inlets low down and the outlets high up convection air currents are promoted within the enclosure 6 so that when the engine is stopped and the fan is not rotating there will still be an air flow through the enclosure 6. Each of the outlets 16 and 17 has a flap valve 18 which is adapted to be automatically closed in the event of a fire occurring in the enclosure 6.

The top 19 of the enclosure 6 is provided with a sound absorbent covering.

I claim:

1. A truck comprising:
   a. a chassis on which an engine is mounted;
   b. a cab tiltably mounted on the chassis and in its operative position overlying the engine at least in part;
   c. an enclosure surrounding the engine when the cab is in its operative position, the enclosure comprising substantially two parts, a first fixed part carried by the chassis and a second movable part carried by the cab so that when the cab is tilted the second part separates from the first part to expose at least part of the engine;
   d. the engine enclosure having at least one air inlet in its leading end which is positioned in the front of the fixed part of the enclosure and therefore relatively low down and at east one air outlet located at the rear end of the enclosure in the second movable part of the enclosure and therefore relatively high up so as to promote convection currents within the enclosure for cooling the engine after it has been stopped.

2. A motor road vehicle according to claim 1 wherein the enclosure has a plurality of air inlets in its fixed part, and a plurality of air outlets in its second movable part.

3. A motor road vehicle as claimed in claim 2 in which each of the said outlets is fitted with a valve, said valve closing automatically in the event of a fire within the enclosure.

4. A motor road vehicle as claimed in claim 1 in which seals are fitted on the joint edges of the second part of the engine enclosure, but not at the joint edges of the first part so that when the truck cab is tilted the seals between the first and second parts of the engine enclosure will be moved clear and be less likely to be damaged during maintenance of the engine.

5. A motor road vehicle as claimed in claim 1 in which the engine enclosure has an undertray which is detachably secured to the underside of the front part of the enclosure.

6. A motor road vehicle as claimed in claim 1 in which a fan is positioned in front of the enclosure and its outlet connected to the air inlet of the enclosure by at least one duct so that cooling air can be fed into the enclosure.

7. A motor road vehicle as claimed in claim 1 in which the interior of the second part of the enclosure incorporates sound deadening absorbing material.

8. A motor road vehicle according to claim 3 wherein said valve is a flap valve.

9. A motor road vehicle according to claim 6 wherein said fan is a centrifugal fan.

10. A motor road vehicle according to claim 2 wherein said fan is a mixed flow fan.

* * * * *